United States Patent Office 3,294,717
Patented Dec. 27, 1966

3,294,717
PROCESS AND COMPOSITION FOR PRODUCING ORGANOPOLYSILOXANES
Karl W. Krantz, Schenectady, N.Y., assignor to General Electric Company, a corporation of New York
No Drawing. Filed Dec. 23, 1963, Ser. No. 332,897
6 Claims. (Cl. 260—18)

This invention relates to the self-condensation of organopolysiloxanes, especially arylsilsesquioxane polymers. More particularly, this invention relates to the self-condensation of hydroxyl-terminated phenylsilsesquioxane polymers.

The arylsilsesquioxane polymers, such as those described in the present invention, are distinguished by their structure which resembles that of a ladder. The $RSiO_{1.5}$ units are arranged in a structure which can be represented as,

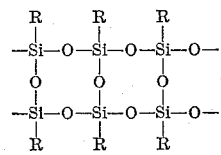

Thus, the polymers are characterized by recurring units having the structural formula,

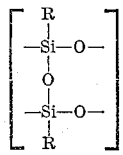

These compounds may be called arylsilsesquioxane ladder polymers, and the term ladder will be used throughout this specification to describe the arylsilsesquioxane polymers. R, representing the aryl group, can be, for example, phenyl, paraphenoxyphenyl, cyanophenyl, benzoylphenyl, tolyl, xylyl, ethylphenyl, naphthyl, biphenyl, etc.

Arylsilsesquioxane ladder polymers have previously been shown, for example, in patents to Sprung et al., 3,017,385, and Brown et al., 3,017,386, assigned to the same assignee as the present invention. In the aforementioned Brown et al. patent, the formation of arylsilsesquioxane polymers having an intrinsic viscosity in benzene at 25° C. of at least 0.4 dl./g., from lower intrinsic viscosity (shorter chain length) arylsilsesquioxane polymers was shown. The process there involved siloxane rearrangement of the lower viscosity polymers using an alkaline rearrangement catalyst to react upon the siloxane bonds, and thus couple the shorter ladder segments to form the new high viscosity ladder polymer.

This prior art method of forming higher viscosity ladder polymers has some disadvantages. For example, the final critical step is a siloxane rearrangement which is highly sensitive to solvent concentration and it has been substantially impossible to form the polymer at point of use, such as is desirable in coating applications. Further, it is essential to remove the alkali metal rearrangement catalyst by a solution treatment in order that the finally produced material be stable. If the potassium rearrangement catalyst is allowed to remain in the finally cured material, it may promote cleavage of the higher molecular weight material to shorter ladder segments. The solutions of the high intrinsic viscosity ladder polymer have extremely high bulk viscosities, even at low (5–10%) resin concentrations so that uniform coatings or films of practical thickness often require an excessive number of coats or dips, and the volatilization of burdensome amounts of solvent.

On the other hand, by the process of the present invention, high molecular weight ladder polymers are formed by the condensation of arylsilsesquioxane ladder polymers containing silanol chain terminals. Thus, the non-precise siloxane bond cleavage utilizing caustic catalysts is avoided by the more precise polymer formation through hydroxyl condensation. Additionally, as the intrinsic viscosity of the silanolated ladder polymer is relatively low, by comparison with the ultimately formed arylsilsesquioxane ladder polymers, a solution for use in applying a coating of the ultimate high molecular weight ladder polymer may contain higher resin concentrations. This permits fewer dips to accomplish the same coating thickness, thus lowering the amount of solvent which need be removed.

It is, therefore, one object of this invention to provide a method for forming arylsilsesquioxane polymers, having a ladder structure, which allows greater ease of handling and greater control than previous methods.

It is another object of this invention to provide a process for forming high molecular weight arylsilsesquioxane ladder polymers by the condensation of chain terminal silicon-bonded hydroxyl groups.

It is a further object of this invention to provide a coating solution for applying a film of arylsilsesquioxane ladder polymers allowing higher resin concentrations, greater control in film formation, and easier handling than prior arylsilsesquioxane ladder polymer coating compositions.

Briefly, the present invention involves the self-condensation of arylsilsesquioxane ladder polymer segments having silicon-bonded hydroxyl chain-terminating units in the presence of a solvent and a mildly basic catalyst. This self-condensation results in the formation of arylsilsesquioxane ladder polymers having higher molecular weights (and longer chain length) than the starting segments.

The arylsilsesquioxane ladder polymer segments having silicon-bonded hydroxyl chain-terminal units (referred to hereinafter for brevity as "starting ladder polymer segments") are described in my copending application Serial No. 332,947, filed concurrently herewith and assigned to the same assignee as the present invention. These starting ladder polymer segments have the formula:

( ) 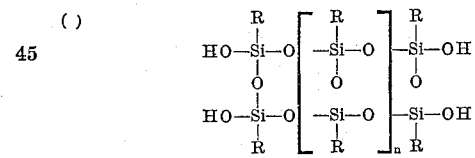

where R is an aryl group as previously defined and $n$ has a value sufficiently great to provide the required intrinsic viscosity of the aforementioned ladder segments. As explained in my aforementioned copending application, these starting ladder segments have intrinsic viscosities of at least 0.05 dl./g., e.g., from 0.05 to 0.5 or 1.0 dl./g. In general, the value of $n$ in the preceding formula, which corresponds to such intrinsic viscosity, is of the order of from 25 to about 300 or 500.

In effecting the self-condensation reaction of the present invention, a solution of the starting ladder polymer segments and a polymerization catalyst is heated in the presence of the surface to be coated at a temperature of from about 100° C. to 160° C. for as little as 5 to 10 minutes. The time for which the coating composition must be heated varies with the temperature and the particular catalyst utilized in the operation. A more normal time for curing the polymer is from about 30 to 180 minutes to effect the condensation of the starting ladder polymer segments. The application of heat to the solution results not only in the condensation of the polymer segments, but additionally, with the particular catalysts used, causes the vaporization of the polymerization catalyst, in some cases following its breakdown.

Application of the ladder polymers of the prior art in the form of coatings was, of necessity, conducted from benzene solutions, as these were the most practical from the standpoint of safety and cost. The prior art polymers were insoluble in toluene. As the starting ladder polymer segments employed in the present invention are soluble not only in benzene, but additionally in toluene, a savings in cost and improved safety are attainable. Benzene has a closed cup flash point of 12° F., while toluene has a flash point of from 43° F. to 50° F.

As previously mentioned, solutions of the high polymers previously used have extremely high bulk viscosities, even at low (5–10%) resin concentrations. For example, the bulk viscosity of a ladder polymer having an intrinsic viscosity of 3.5 as a 10% solution in benzene was found to be 10,000 centipoises. This makes uniform coatings or films of the required thickness difficult to produce because of the excessive number of coats or dips and the volatilization of burdensome amounts of solvent. On the other hand, solutions containing up to 50%, depending upon the intrinsic viscosity, of the starting ladder polymer segments of the present invention are still easily usable. For example, a 50% solution of starting ladder polymer segments having an intrinsic viscosity in benzene at 25° C. of 0.05 has a bulk viscosity of about 150 centipoises at 25° C. Solutions containing as little as 10% polymer allow effective coatings with only one or two applications. Thus, the number of processing steps and the amount of solvent which must be evaporated are significantly reduced.

A further example of the ease of handling solutions of the present invention is the following table showing the solution viscosity of a phenyl starting ladder polymer segment having an intrinsic viscosity in benzene at 25° C. of 0.60 dl./g.

| Percent polymer in toluene solution: | Solution viscosity, centipoises at 25° C. |
| --- | --- |
| 20.0 | 430 |
| 18.3 | 300 |
| 11.9 | 28 |

In addition to the handling advantages realized in utilizing the above-mentioned starting ladder polymer segments, several technical benefits are also attained. As an example, the final polymer formed by the condensation reaction, which is the subject of this invention, retains hydroxyl chain terminal groups, though of course, the final polymer has a higher intrinsic viscosity (longer chain length) than the original polymeric material. The terminal polymer segments of the final ladder polymer are not completely condensed and it is the terminal groups from these segments which are retained. The condensation reaction of the present invention can be represented as follows:

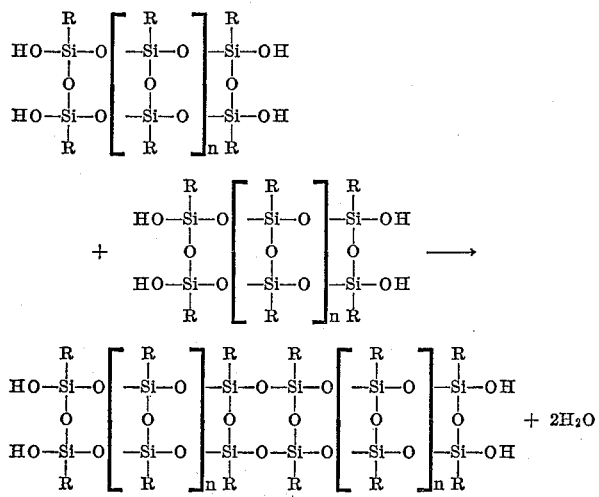

where R and $n$ are as previously defined. The effect of these hydroxyl terminals is to provide greater adhesion between the ladder polymer coating and the coated substrate. For example, copper coated with a non-hydroxyl-terminated ladder polymer will not withstand flexure. Under flexure, the ladder coating cracks and falls away from the substrate. On the other hand, copper coated with a ladder polymer formed by the process of this invention can be bent without cracking or peeling. Representative of this is the coating described in Example VII.

Further, in order to apply the coatings of the prior art, not only is an extremely high temperature required, but exact concentration control is also necessary. This is due to the criticality of the conditions necessary for the siloxane bond rearrangement. On the other hand, as the process of the present invention involves a hydroxyl condensation, the concentration need be controlled only within the broad limits dictated by the ability to handle the solution and the problems involved in solvent removal.

An alkali metal hydroxide is used as the catalyst in the formation of the high intrinsic viscosity ladder polymers of the prior art. Following cure of the polymer, the catalyst either remains in the coating or is removed by a complex solvent treatment. The latter is not only difficult, but time consuming. However, if the alkali metal hydroxide remains in the coating, the temperature conditions to which the coated substrate are likely to be subject may reactivate the catalyst, causing a reequilibration which results in the breakdown of the polymer. The catalysts which are employed in the condensation reaction of the present invention are heat labile catalysts. That is, they will break down under the action of the heat necessary to cure the polymer. In some cases, this breakdown results in volatile products which vaporize under the curing conditions and are thereby removed from the polymeric coating. In any event, due to the breakdown, subsequent reaction is impossible as no operative catalyst remains in contact with the cured polymer. Thus, neither is an expensive decatalysis necessary nor does a problem of subsequent polymer breakdown exist using the process of the present invention.

The high polymer formation process of the present invention is accomplished by the condensation of the terminal hydroxyl radical of the starting ladder polymer segments, rather than by siloxane cleavage and rearrangement, as previously mentioned. This condensation can be catalyzed by relatively weak bases such as amines, heat-labile quaternary ammonium or quaternary phosphonium compounds, or metal salts of organic acids. The onium compounds used are the bases, salts of weak acids, and salts of volatile acids. The amount of catalyst necessary to carry out the reaction is from about 0.3 to about 5%. The amines and onium compounds, in the low catalyst concentrations required, effect no significant siloxane bond cleavage or rearrangement while present in the polymer solution. Further, they are eventually volatilized or deactivated by the condensation process so that no special decatalysis step is necessary to effect the thermal stability of the final high polymer.

Exemplary of catalyst compounds which can be used in the present process are primary, secondary, and tertiary amines such as piperidine, 1,4-diazabicyclo-(2,2,2)octane, triethanolamine, tetramethylguanidine, ethylenediamine, and cyclohexylamine; quaternary ammonium compounds such as tetramethylammonuim acetate and benzyltriethylammonium acetate; quaternary phosphonium compounds such as tetramethylphosphonium acetate and tetramethylphosphonium hydroxide; metal salts such as tin octoate, zinc naphthenate and dibutyl tin dilaurate. The tetramethylphosphonium hydroxide should be utilized only when the coating solution is to be used immediately. Of the mentioned catalyst compounds, the most effective to date have been found to be tetramethylammonium acetate and 1,4-diazabicyclo-(2,2,2)octane.

The condensation reaction of the present invention is generally effected at the point of use of the products resulting from the process. For example, polymerization can be effected as the materials employed in the practice of the present invention are in contact with surfaces to be coated, such as plain surfaces or surfaces of electrical conductors or other articles. The process can be carried out in any convenient means insofar as the process is carried out while the starting ladder segments are in contact with the condensation catalyst employed to effect the condensation. This can be accomplished in either the presence or the absence of solvents.

One general method for effecting the condensation is to form a solution of the starting ladder polymer segments having a solids concentration of from about 5 to 70 percent. To this solution is added to the catalyst in the proportions previously described and the reaction mixture is maintained at temperature of the reaction while in contact with the surface to be coated. For example, the surface to be coated can be dipped into the solution of the starting ladder segment and catalyst, removed from the solution and then maintained at a temperature of from about 100° C. to 160° C. to effect both evaporation of the solvent and condensation of the ladder segments to a high molecular weight arylsilsesquioxane polymer coating on the surface of the article. The time required for such condensation reaction is no greater than the time required for evaporation of the solvent from the reaction mixture. While any solvent which will dissolve the starting ladder polymer segments and which is inert to the reactants under the conditions of the reaction may be employed, it is preferred for convenience to employ benzene or toluene as a solvent.

Another method for effecting the condensation of the starting ladder segments to the final polymer is by the technique commonly known as fluidized bed coating, wherein a mass of powdered starting ladder segments is fluidized in the presence of one of the catalysts heretofore mentioned and an article to be coated is heated to a temperature of the order of 100 to 160° C. or more and brought into contact with a fluidized bed. This action causes preliminary adhesion of particles of the polymer and catalyst from the fluidized bed to the surface of the article and continued maintenance of the article at an elevated temperature, such as 100 to 160° C., will cause final condensation of the starting polymer to the final material, resulting in a coated article.

It is also possible to prepare molded articles by the technique of the present invention. In such case, a mixture of the powdered starting ladder polymer segments and the curing catalyst are forced into a suitable mold by molding techniques known in the art, with the mold being maintained at a temperature sufficiently high to cause condensation of the polymer to a high viscosity arylsilsesquioxane. In general, such molding temperature is of the order of 100 to 160° C.

The following examples are given by way of illustration of the process of forming the high polymer ladder compounds, and the coating compositions which may be utilized for the formation according to the present invention. These illustrations should not be considered as limiting in any way.

*Example I*

A hydroxyl-terminated phenylsilsesquioxane ladder polymer (0.0799 gm.) was dissolved in benzene to form a solution having a solids content of 5 percent. The polymer had an intrinsic viscosity in benzene at 25° C. of 0.37 dl./g., and corresponded to the material of Formula 1 where R is phenyl and $n$ is 190. This polymer solution was catalyzed with a benzene-methanol solution of tetramethylammonium acetate containing excess acetic acid, the amount of catalyst present in the solution being equivalent to 0.3% of the ladder polymer. The clear solution was applied to an aluminum surface and evaporated to dryness at 40° C. and baked for 30 minutes at 125° C. in an air circulating oven. After baking, the polymer showed an intrinsic viscosity in benzene at 25° C. of 0.495, approximately a 30% increase. Without further catalysis, the product was dried and baked at 125° C. for 150 additional minutes. This product was a tough, clear film totally soluble in benzene, and having an intrinsic viscosity in benzene at 25° C. of 0.56 dl./g.

The following table shows the results of other self-condensations of the same hydroxyl-terminated ladder polymer used in Example I.

| Example | Percent Tetramethylammonium Acetate | Baking Temperature, Degrees C. | Baking Time, Minutes | Intrinsic Viscosity in Benzene at 25° C. |
|---|---|---|---|---|
| II | 0.5 | 135 | 180 | 0.63 |
| III | 0.3 | 150 | 30 | 0.77 |
| IV | 0.5 | 160 | 30 | 0.75 |

Tetramethylammonium acetate is known to decompose rapidly at 150° C., forming trimethylamine. At 150° C., however, the loss of catalyst is more than offset by the faster rate of silanol condensation, as shown by the viscosity increase in Example III. Although the process is workable at 160° C., as shown by Example IV, the increase in rate of silanol condensation does not fully offset the rate of decomposition of the tetramethylammonium acetate catalyst. A particularly useful process is a condensation carried out at a temperature of about 150° C. to 160° C., followed by an afterbake at about 170° C. to 200° C., or even higher, to destroy the residual traces of catalyst.

*Example V*

The hydroxyl-terminated phenylsilsesquioxane ladder polymer (0.0913 gm.) of Example I having an intrinsic viscosity in benzene at 25° C. of 0.37 dl./g. was dissolved in benzene to form a 5 percent solution. The polymer was catalyzed by 0.5% 1,4-diazabicyclo-(2,2,2)octane added as a 1 mg./ml. solution in benzene. The resultant solution was applied to an aluminum surface and dried at 40° C., and the clear film baked for 30 minutes at 160° C. The product was a clear, hard film, totally soluble in benzene, and having an intrinsic viscosity in benzene at 25° C. of 0.63 dl./g.

*Example VI*

To show the utilization of lower molecular weight polymers, a hydroxyl-terminated phenylsilsesquioxane polymer having an intrinsic viscosity in benzene at 25° C. of 0.11 dl./g. was dissolved in benzene. This polymer corresponded to Formula 1 where R is phenyl and $n$ is 60. A benzene solution containing tetramethylammonium acetate in an amount equivalent to 0.3% of the ladder polymer was added. The resultant mixture was applied to an aluminum surface and baked for 3 hours at 125° C. and gave a clear, brittle film which was completely soluble in benzene. The final product had an intrinsic viscosity in benzene at 25° C. of 0.33 dl./g., or triple that of the original hydroxyl-terminated ladder polymer.

*Example VII*

Sufficient phenylsilsesquioxane ladder polymer was dissolved in toluene to form a solution containing 11.9% solids. The ladder polymer had an intrinsic viscosity in benzene at 25° C. of 0.60 dl./g., and correspond to Formula 1 when R is phenyl and $n$ is 280. To this solution was added 0.025 gm. of 1,4-diazabicyclo-(2,2,2)octane. This constituted 2.5% of the catalyst based on the ladder polymer present. Three 50 mil diameter copper wires were cleaned with a polishing agent, rinsed with toluene, and dipped into the previously prepared ladder polymer solution. The wires were removed from the solution, air dried for 15 minutes, and then baked in an oven at 150° C. for 30 minutes. The coating, after baking, was uniform, transparent, and tough. The coated copper wires could be bent around a mandrel having a diameter of 150 mils without cracking. A similarly coated wire had been formed using the original non-hydroxyl-terminated ladder polymer which had been the raw material for the 0.60 intrinsic viscosity hydroxyl-terminated ladder polymer. The adhesion of the original polymer was far less than that of the polymer of this example, cracking and peeling from the wires on being bent around the 150 mil mandrel.

*Example VIII*

A portion of phenylsilsesquioxane ladder polymer from the same batch as that used in the previous example was dissolved in benzene and catalyzed by an amount of tetramethylammonium acetate equal to 0.5% of the ladder polymer. The solution was evaporated to dryness on an aluminum surface and baked for 60 minutes at 150° C. An afterbake at 200° C. for 40 minutes was then performed to destroy the residual catalyst. The final product was a tough film having an intrinsic viscosity in benzene at 25° C. of 1.40 dl./g. This constituted greater than a two-fold increase in the intrinsic viscosity of the starting material.

*Example IX*

To demonstrate that the described process results in the formation of higher molecular weight ladder polymers by means of a silanol condensation, rather than by a siloxane rearrangement, a control run was made utilizing a tetramethylammonium acetate catalyst with a non-hydroxyl-terminated phenylsilsesquioxane ladder polymer. A typical "pre-polymer," as described in the patent to Brown et al., 3,017,386, was utilized in this example. The dried product had an intrinsic viscosity of 0.082 dl./g. in benzene at 25° C., and had an infrared spectrum showing essentially a ladder polymer. The pre-polymer was treated to decatalyze it by filtering a benzene solution twice through beds of diatomaceous earth, and then by precipitating with methanol. This decatalyzed polymer contained no more than 0.006% by weight hydroxyl groups as compared with the 0.8% by weight present in a starting ladder segment having a comparable intrinsic viscosity. The decatalyzed polymer (0.078 gram) was dissolved in benzene and catalyzed with 0.5% tetramethylammonium acetate. This was dried on an aluminum surface at 40° C. and baked for 30 minutes at 160° C. The decatalyzed polymer was recovered and found to be unchanged, still having an intrinsic viscosity in benzene at 25° C. of 0.082 dl./g. This result is in contrast with that of Example IV using the same catalyst under the same conditions, where the viscosity increase was approximately two-fold, and with that of Example VI using a hydroxyl-terminated phenylsilsesquioxane ladder polymer having approximately the same intrinsic viscosity, where the viscosity increase was approximately three-fold. The lack of any change in the starting polymer either in the direction of gelation or in the direction of long chains, is similar to that found in other experiments, wherein tetramethylammonium acetate, and even stronger organic bases, such as piperidine and tetramethylguanidine, completely failed in pressure vessel runs to convert potassium-free pre-polymer to a higher ladder polymer.

Examples I–VIII disclose not only the process conditions and catalysts which can be utilized to form longer chain arylsilsesquioxane ladder polymers from short chain hydroxyl-terminated ladder polymers, but, additionally, disclose solutions which might be made and stored at room temperature for considerable lengths of time for later use in coating operations.

While specific embodiments of the invention have been shown and described, the invention should not be considered as limited to the particular formulations or conditions used. It is intended, therefore, by the appended claims, to cover all modifications within the spirit and scope of this invention.

What I claim as new and desire to secure by Letters Patent of the United States is:

1. A process which comprises heating (A) a toluene-soluble arylsilsesquioxane polymer in a solvent solution at a temperature of from about 100° C. to 160° C. for a time sufficient to effect its polymerization, utilizing a condensation catalyst selected from the class consisting of amines, quaternary ammonium compounds, quaternary phosphonium compounds and metal salts of organic acids, where (A) has the formula,

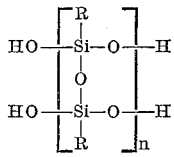

R is aryl and $n$ has a value of from 25 to about 500, inclusive, and is the product of hydrolysis of (B), an arylsilsesquioxane polymer having an intrinsic viscosity in benzene at 25° C. of at least 0.1 dl./g., said hydrolysis being carried out in the presence of a basic amine catalyst and a cosolvent for (B) and water.

2. The process of claim 1 wherein the catalyst is tetramethylammonium acetate.

3. The process of claim 1 wherein the catalyst is 1,4-diazabicyclo-(2,2,2)octane.

4. A composition consisting essentially of
  (a) a hydrocarbon solvent solution of a polymer of the formula,

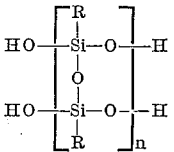

which is the product of hydrolysis of an arylsilsesquioxane polymer having an intrinsic viscosity in benzene at 25° C. of at least 0.1 dl./g., said hydrolysis being carried out in the presence of a basic amine catalyst, and a cosolvent for said arylsilsesquioxane polymer and water, and
  (b) a condensation catalyst selected from the group consisting of amines, quaternary ammonium compounds, quaternary phosphonium compounds and metal salts of organic acids, where R is aryl, and $n$ has a value of from about 25 to about 500, inclusive.

5. The composition of claim 4 wherein the catalyst is 1,4-diazabicyclo-(2,2,2)octane.

6. The composition of claim 4 wherein the catalyst is tetramethylammonium acetate.

References Cited by the Examiner

UNITED STATES PATENTS

| | | | |
|---|---|---|---|
| 2,906,734 | 9/1959 | Clark | 260—46.5 |
| 3,017,385 | 1/1962 | Sprung et al. | 260—46.5 |
| 3,017,386 | 1/1962 | Brown et al. | 260—46.5 |
| 3,032,528 | 5/1962 | Nitzsche et al. | 260—448.2 |
| 3,160,601 | 12/1964 | Hyde | 260—18 |
| 3,162,614 | 12/1964 | Katchman | 260—46.5 |
| 3,167,555 | 1/1965 | Farkas et al. | 260—79 |
| 3,202,634 | 8/1965 | Merker | 260—46.5 |

LEON J. BERCOVITZ, *Primary Examiner.*

M. I. MARQUIS, *Assistant Examiner.*